(12) United States Patent
Jordahl

(10) Patent No.: US 9,467,280 B2
(45) Date of Patent: Oct. 11, 2016

(54) METHODS AND SYSTEMS FOR PERSONAL AUTHENTICATION

(76) Inventor: Jena Jordahl, Wellesley, MA (US)

( * ) Notice: Subject to any disclaimer, the term of this patent is extended or adjusted under 35 U.S.C. 154(b) by 8 days.

(21) Appl. No.: 13/515,238

(22) PCT Filed: Dec. 10, 2010

(86) PCT No.: PCT/US2010/059905
§ 371 (c)(1),
(2), (4) Date: Jan. 3, 2013

(87) PCT Pub. No.: WO2011/072231
PCT Pub. Date: Jun. 16, 2011

(65) Prior Publication Data
US 2013/0108041 A1  May 2, 2013

Related U.S. Application Data

(60) Provisional application No. 61/285,374, filed on Dec. 10, 2009.

(51) Int. Cl.
*H04L 9/08* (2006.01)
*H04L 9/32* (2006.01)
*H04L 29/06* (2006.01)

(52) U.S. Cl.
CPC .......... *H04L 9/0816* (2013.01); *H04L 9/3215* (2013.01); *H04L 9/3231* (2013.01); *H04L 9/3273* (2013.01); *H04L 63/0492* (2013.01); *H04L 63/061* (2013.01); *H04L 63/08* (2013.01); *H04L 2209/56* (2013.01); *H04L 2209/805* (2013.01)

(58) Field of Classification Search
USPC ......... 388/44; 380/44, 255, 264, 276; 726/2, 726/21, 36; 713/150, 163, 181
See application file for complete search history.

(56) References Cited

U.S. PATENT DOCUMENTS

| | | | |
|---|---|---|---|
| 6,118,874 A | 9/2000 | Okamoto et al. | |
| 7,882,363 B2 * | 2/2011 | Duffy et al. | 713/186 |
| 2006/0186989 A1 * | 8/2006 | Chon et al. | 340/5.61 |
| 2006/0220789 A1 | 10/2006 | Suzuki et al. | |
| 2007/0206786 A1 | 9/2007 | Chakraborty | |
| 2008/0181398 A1 | 7/2008 | Pappu | |
| 2008/0181399 A1 * | 7/2008 | Weise et al. | 380/44 |
| 2009/0315673 A1 * | 12/2009 | Huang | 340/5.61 |
| 2011/0002461 A1 * | 1/2011 | Erhart et al. | 380/44 |

OTHER PUBLICATIONS

International Search Report on PCT/US2010/059905 dated Aug. 26, 2011.
Written Opinion on PCT/US2010/059905 dated Aug. 26, 2011.
International Preliminary Report on Patentability on PCT/US2010/059905 dated Jun. 21, 2012.

* cited by examiner

*Primary Examiner* — Jason K Gee
*Assistant Examiner* — Sharif E Ullah
(74) *Attorney, Agent, or Firm* — John D. Lanza; Foley & Lardner LLP

(57) ABSTRACT

A method for creating personal authentication keys includes the steps of determining a number of RFID tags, generating a key, partitioning the key into a number of parts, the number of parts corresponding to the number of determined RFID tags, and writing each of the plurality of key parts to a corresponding RFID tag.

20 Claims, 5 Drawing Sheets

METHODS AND SYSTEMS FOR PERSONAL AUTHENTICATION

CROSS REFERENCE TO RELATED APPLICATIONS

The present application is a US National Stage of International Application No. PCT/US2010/059905, filed Dec. 10, 2010, designating the United States, which claims priority to U.S. Patent Application No. 61/285,374, filed Dec. 10, 2009.

BACKGROUND

1. Technical Field

The present application is directed generally to methods and systems for personal authentication, in particular, to methods and systems for personal authentication using radio frequency identification (RFID) devices.

2. Description of Related Art

As technological advances continue to progress, sophisticated security measures are needed. Personal authentication systems available in the prior art pose several problems. RFID systems may be vulnerable to unauthorized access if a third party uses an RFID reader to attempt to obtain information. If the RFID tag is a WORM (Write Once, Read Many) or a read-only tag, then if an unauthorized third party accesses the information on the tag, the security provided by the tag is breached and the tag must be replaced. Additionally, existing RFID system may not provide notification to the RFID holder if or when the RFID tag is being read.

Existing biometric authentication systems may provide higher security than some available RFID systems. However, incorporating a person's body in the authentication system increases the possibility of bodily harm.

SUMMARY

The increasing prevalence of internet commerce and credit card transactions require particular attention to sophisticated security measures to ensure safety of important personal and financial information. The systems and methods described herein are directed to a personal authentication system to increase security of information without the use of biometric information or the need to memorize and recite cumbersome passwords. The system includes the use of one or more RFID tags that are disguised as everyday items, such as a key ring or jewelry. The RFID tags are enhanced by using advanced cryptography. Additionally, the systems and methods described herein address measures to prevent unauthorized access by third parties.

BRIEF DESCRIPTION OF DRAWINGS

The foregoing and other objects, aspects, features, and advantages of the invention will become more apparent and better understood by referring to the following description taken in conjunction with the accompanying drawings, in which.

DETAILED DESCRIPTION

Figure 1A:
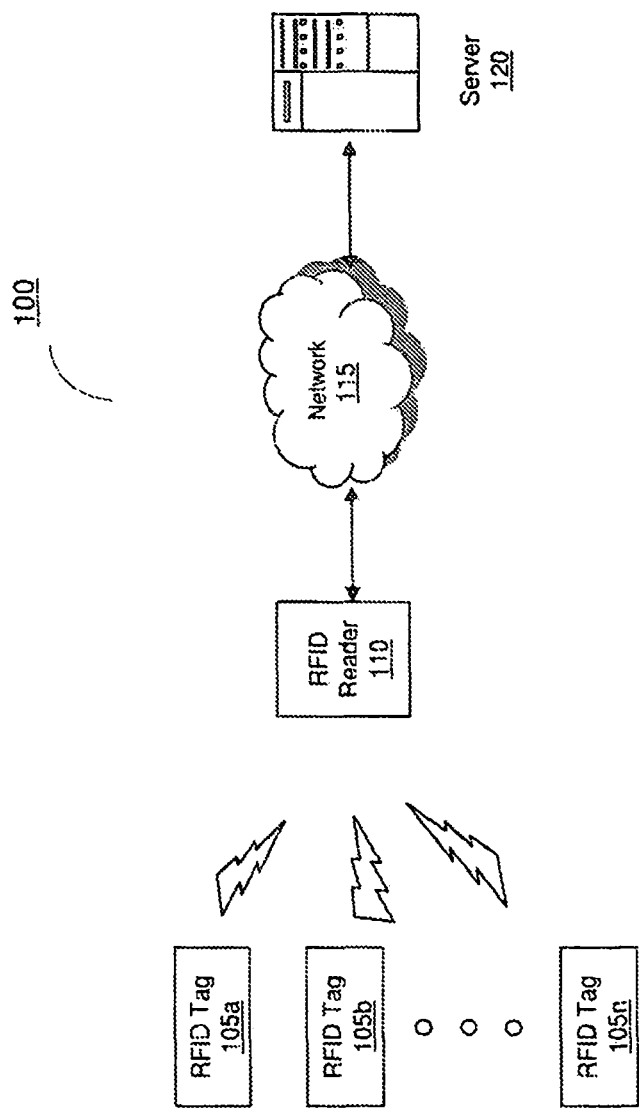
FIG. 1A is a block diagram of an embodiment of a system for personal authentication using RFID.

Referring to FIG. 1A, a block diagram of an embodiment of a system for personal authentication using RFID is shown and described. In brief overview, the system 100 includes one or more RFID tags 105a-105n and an RFID reader 110, in communication with a server 120 over a network 115. Although the drawing depicts an RFID reader in communication with a server, in some embodiments, the system includes only the one or more RFID tags and the RFID reader. Each RFID tag 105 contains a portion of an authentication key as well as data necessary to prevent unauthorized third party access. When the one or more RFID tags 105a-105n are presented to an RFID reader and the entire authentication key is presented, the RFID reader 110 verifies the key and authenticates the user.

Now referring to FIG. 1A, in more detail, an RFID tag 105 is a passive, read-write identification (RFID) device. A passive RFID tag is one that relies entirely on an RFID reader as its power source. A read-write RFID tag can be added to or overwritten numerous times. The RFID tag 105 can include an RFID chip and antennae. The RFID chip can be an integrated circuit for storing and processing information and modulating and demodulating a radio-frequency signal. The antenna is used to receive and transmit the radio-frequency signal. Each RFID tag 105 can be accessed by an RFID reader 110 and can store information transmitted to it. The RFID reader 110 emits radio signals that power up and activate the passive RFID tags 105. The activated RFID tags 105 transmit data to the RFID reader 110 which collects the information Still referring to FIG. 1A, the RFID reader 110 is a device that is used to interrogate RFID tags 105. The RFID reader 110 is a computing device that can include an RFID reader unit, which includes an antenna that emits radio waves. Responsive to the emitted radio waves, the RFID tags are powered up and respond by sending back their data. The RFID reader 110 can also include storage element to store data necessary to authenticate a user once a key is presented. The RFID reader 110 can be in communication with other computing devices, such as a server 120 used for electronic commerce to use data stored on the server 120 to authenticate the user.

Figure 1B:
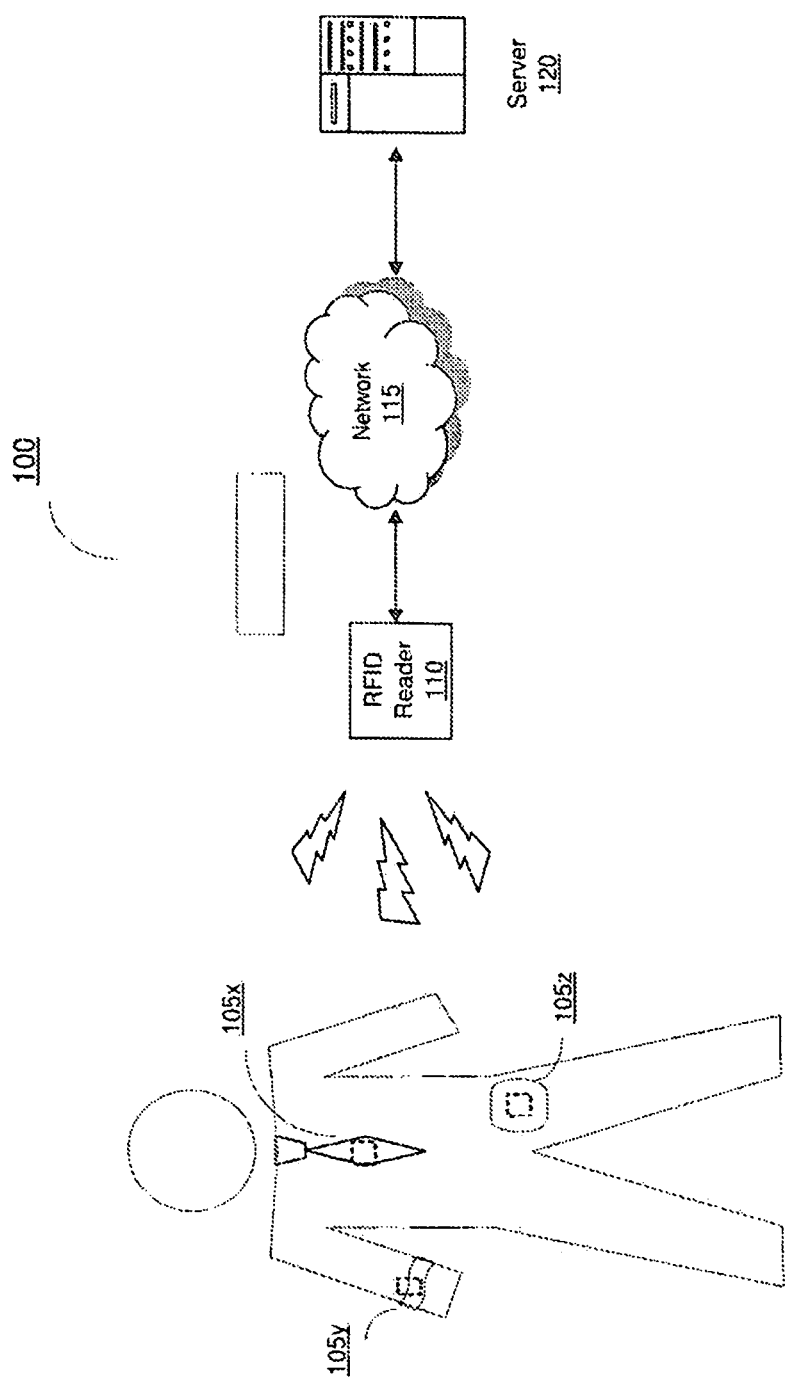
FIG. 1B is a block diagram of an embodiment of a system for personal authentication using RFID.

FIG. 1B is similar to FIG. 1A and will only be discussed in detail to the extent necessary. FIG. 1B is an exemplary embodiment of the system 100 described herein. As depicted, the RFID tags 105 can be in the form of common objects, such as a tiepin 105x, a watch 105y, and a wallet 105z. An RFID tag 105 can also be a bead on a necklace, a stone on a ring, key ring, card, or other such inconspicuous item. The RFID tag 105 can also be attached to common objects by a temporary adhesive, permanent adhesive, or other adhesion mechanism. The RFID tag can be attached to common objects by other methods, such as clips, inserts, or magnets.

RFID tags can be vulnerable to third party unauthorized access. The present disclosure provides mechanisms to deal with third party attempts to access any of the RFID tags in the system described herein.

Each RFID tag 105 can be equipped with an auditory or visual mechanism to indicate that a tag is being read. For example, a tag can emit a tone or a series of short tones signifying that the tag is being read. Similarly, a tag can be equipped with a small bulb, such as an LED that will flash when being read by an RFID reader 110.

Optionally, the system can include an RFID tag controller. An RFID tag controller is a master device which signals to the RFID tags 105 to cease emitting sounds or lights for a specified period of time. The RFID tag controller can be in the form of a device that includes a button. When the button is pushed by the user, the RFID tags within range receive a signal from the controller and temporarily stops emitting sounds or lights when the RFID tag is being read.

Figure 2:
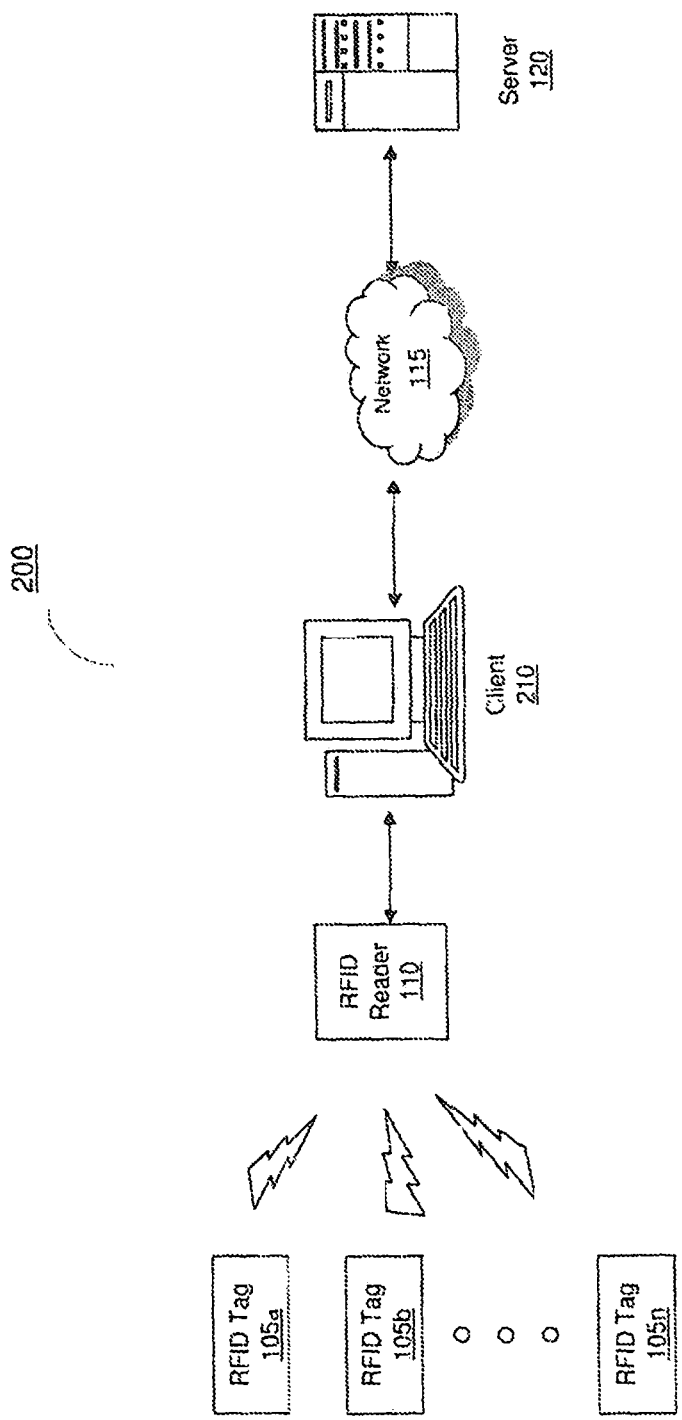
FIG. 2 is a block diagram of an embodiment of a system for creating personal authentication keys using RFID.

Referring to FIG. 2, a block diagram of an embodiment of a system for creating personal authentication keys using RFID is shown and described. In brief overview, the system 200 includes the one or more RFID tags 105a-105n and an RFID reader 110 in communication with a computing device 210. The computing device 210 communicates over a network 115 with a server 120. Each RFID tag 105 is a read-write passive tag. A user generates a key using methods described herein. The key is transmitted to the RFID reader 110, which activates the RFID tags 105 and transmits the key or portion thereof to the RFID tag 105. In some embodiments, the client 210 communicates over the network 115 to a server 120 that receives the key and will later use it for authentication.

Now referring to FIG. 2, in more detail, the computing device 210 can include an RFID reader 110. In other embodiments, the computing device is in communication with the RFID reader 210 through such means as USB or infrared. The computing device can also be in communication with the RFID reader 110 over the network 115.

In some embodiments, the computing device may be a handheld or mobile device, permitting the user to gain access to the system and generate or modify keys remotely. In other embodiments, the system can be hosted on a remote web server. The remote web server may be accessed by a client computer or a handheld or mobile device, permitting the user to gain access to the system as long as they had access to an RFID reader 110 to read and write to the RFID tags 105.

The system generates the unique key for the user and communicates with the RFID reader 110. The RFID reader 110 reads the RFID tag 105 and then writes the information provided by the system onto the tag 105.

Figure 3:
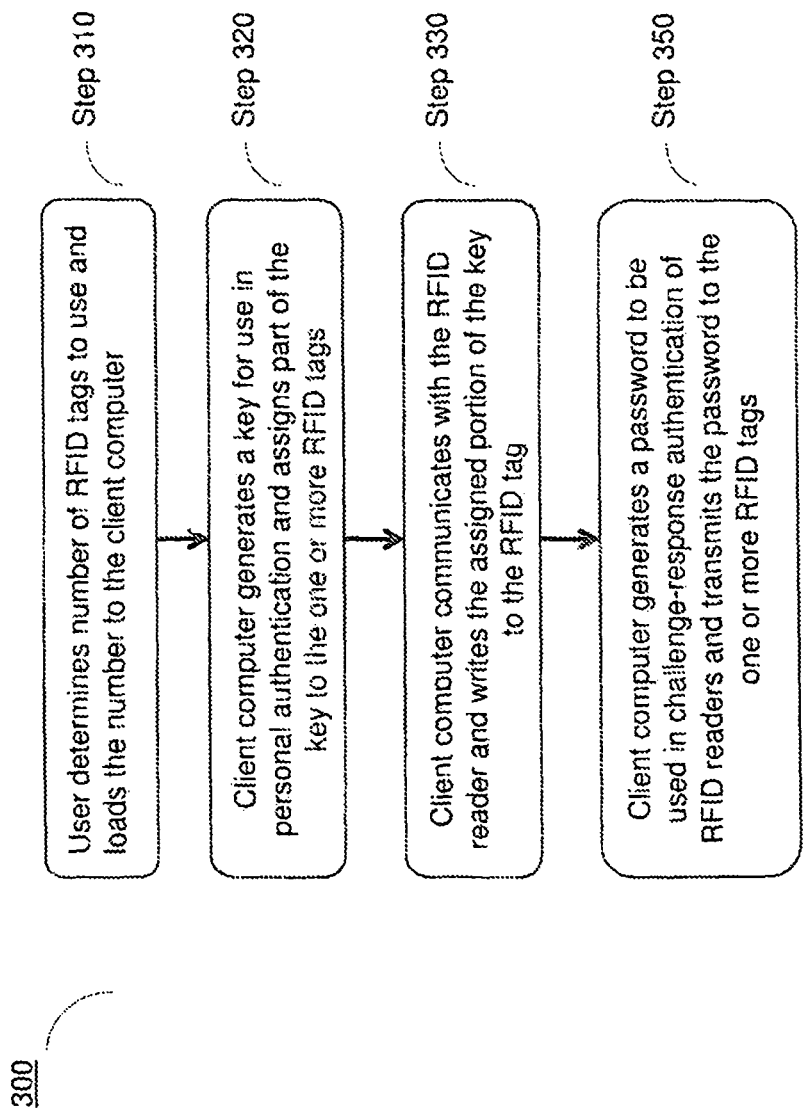
FIG. 3 is a flow diagram of one embodiment of a method for creating personal authentication keys using RFID.

Now referring to FIG. 3, a flow diagram of one embodiment of a method for creating personal authentication keys using RFID is depicted and described. In brief overview, the method 300 includes a user determining the number of RFID tags to use for personal authentication and loading the number to the client computer (Step 310). The client computer then generates a key for use in personal authentication and assigns part of the key to the one or more RFID tags (Step 320). The client computer then communicates with the RFID reader and writes the assigned portion of the key to the RFID tag (Step 330). Optionally, the client computer generates a password to be used in challenge-response authentication of RFID readers and transmits the password to the one or more RFID tags (Step 340).

The system described herein permits a user to determine the number of RFID tags 105a-105n to be used for personal authentication. A user can choose as few as a single RFID tag 105 or may choose many RFID tags 105. Once the user chooses the number of RFID tags, they must load the number onto the client computer 210. The client computer 210 then uses the number to generate a key for use in the personal authentication system. The key generated for use in the personal authentication system 100 can be generated using known methods of public key encryption. Public key encryption uses mathematically related cryptographic keys, namely a public key and a private key. The keys are mathematically related but it is computationally infeasible to calculate the encryption of one key using the other. The key can also be generated using known cryptography methods used in the art.

Once a key has been generated, a client computer communicates with the RFID reader and writes the assigned portion of the key to the RFID tag 105. In some embodiments, the RFID reader is a component within the client computer. In other embodiments, the RFID reader is a hardware component in communication with the client computer. The client computer communicates with the RFID reader to activate the RFID tags 105. The RFID reader authenticates the RFID tags that belong to the system. Once the tags have been authenticated, the RFID reader writes the assigned portion of the generated key to the RFID tag 105. This is repeated until all RFID tags 105 have data transmitted to them. Once all data transmission to the RFID tags is complete, the RFID reader conducts a preliminary authentication check to ensure that all the RFID tags have been correctly written to and the combination of the tags works correctly.

Additionally, the client computer 120 also generates multiple challenge-response combination. The client computer generates responses and associates them with an identifier and transmits the responses and identifiers to the RFID tags for use in challenge-response authentication of RFID readers. A challenge-response authentication is a protocol in which an RFID tag issues a question or "challenge" and the RFID reader must provide a valid answer or "response" in order to be authenticated. Once the RFID reader is authenticated, it can request the RFID tag to transmit the key fragment contained therein.

Figure 4:
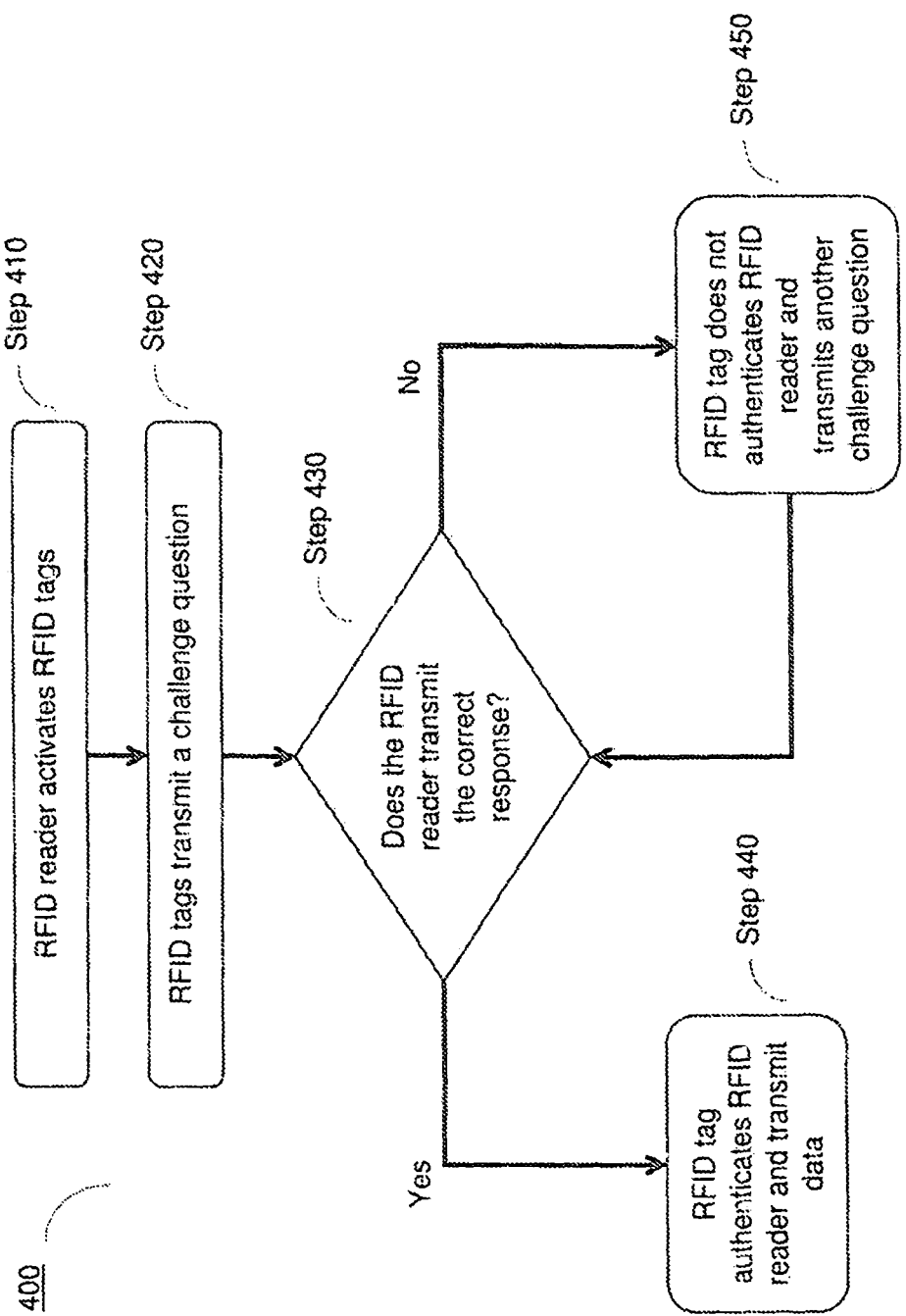
FIG. 4 is a flow diagram of one embodiment of a method for responding to unauthorized RFID readers attempting to read the RFID keys The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

FIG. 4 is a flow diagram of one embodiment of a method for responding to an unauthorized RFID reader attempting to read the RFID tags 105 is depicted and described. In brief overview, the method 400 includes an unauthorized RFID reader activating an RFID tag 105 containing all or part of an authentication key (Step 410). The RFID tag 105 responds by transmitting a challenge question to the RFID tag 110 (Step 420). At step 430, it is determined whether the RFID reader transmits a correct response back to the RFID tag 105. If the RFID reader correctly responds to challenge question transmitted by the RFID tag 105, the RFID reader 110 is authenticated and the RFID tag 105 transmits data requested by the reader 110 (Step 440). If the RFID tag does not authenticate the RFID reader 110, the RFID tag will submit another challenge question (Step 450).

At step 410, an RFID reader actuates an RFID tag 105 by emitting radio signals to power the tags. In response to the receiving the radio signals, the RFID tag 105 can emit a sound or flash a light, as described above, to signal to the person possessing the RFID tag that the tag 105 is currently being read.

Once powered, the RFID tag transmits a challenge question to the RFID reader 110 previously transmitted to it from the client computer 210. In order to gain access to data on the RFID tag 105, the RFID reader 110 must provide the correct response. If the RFID tag 105 determines that the response received from the RFID reader 110 is correct, the RFID tag 105 authenticates the RFID reader 110 and permits the reader 110 access to the information on the RFID tag 105.

If, however, the RFID reader 110 is unable to transmit a correct response, the RFID tag 105 transmits another challenge question and awaits a response from the reader 110. This step may be repeated until the RFID tag 105 is depleted of challenge question. Alternatively, this step may be repeated for a pre-determined number of attempts by the RFID tag 105. If the RFID tag 105 does not receive a response from the RFID reader 110, the RFID tag 105 will loss power and turn off.

In another embodiment of the system, if an unauthorized reader 110 attempts to access an RFID tag 105, the tags could be reordered or switched out for other RFID tags 105. The reordering or switched out RFID tags 105 would essentially create a new protected key. Prior to the modified RFID tag being used for authentication purposes, the modified RFID tag 105 set would need to communicate with the client computer 105 and recorded so that the key would be updated to the modified set.

While the present disclosure has been shown and described with reference to specific embodiments, it should be understood by those skilled in the art that various changes in form and detail may be made therein without departing from the scope of the personal authentication system described herein.

What is claimed:

1. A method for creating personal authentication keys comprising:
   determining a number of RFID tags in a personal authentication system, wherein the RFID tags are attached to, or included in, common objects associated with a person;
   generating a key;
   portioning the key into a plurality of parts, the number of parts corresponding to the number of determined RFID tags;
   creating at least one challenge-response combination;
   writing one of the key parts to an information storage in an RFID tag of the personal authentication system;
   writing at least one challenge-response combination to the information storage of the RFID tag; and
   providing instructions to the RFID tag, for storage in the information storage that, upon execution, causes the RFID tag to:
      present a challenge of the at least one challenge-response combination;
      provide an audiovisual indication that a response to the challenge has been received;
      if a correct response of the challenge-response combination is received, transmit information; and
      if no response is received, turn off.

2. The method of claim 1, further comprising providing the at least one challenge-response combination to an RFID reader.

3. The method of claim 1, the instructions further including instructions causing the RFID tag to present a second challenge-response combination in response to determining that the received response to the challenge is incorrect.

4. The method of claim 1, wherein the audiovisual indication is an audible tone.

5. The method of claim 1, wherein the audiovisual indication is a flash of light.

6. The method of claim 1, the instructions further including instructions for withholding the audiovisual indication when a request is made to read information from the RFID tag responsive to receipt by the RFID tag of a signal from a master controller.

7. A method, comprising: executing instructions from an information storage in an RFID tag, including instructions for:
   receiving a key portion, wherein the key portion is a portion of a key divided into a number of portions corresponding to a number of RFID tags in a personal authentication system;
   writing the key portion to the information storage on the RFID tag;
   receiving a request to transmit information from the information storage on the RFID tag;
   retrieving from the information storage a first challenge-response combination;
   transmitting a first challenge of the first challenge-response combination;
   waiting for a response, and
   if a correct response of the first challenge-response combination is received, transmitting the requested information; and
   if no response is received, turning off the RFID tag;
   wherein the RFID tag is attached to, or included in, a common object associated with a person, and is used for personal authentication.

8. The method of claim 7, further comprising:
   if an incorrect response of the first challenge-response combination is received,
      retrieving a second challenge-response combination from the information storage;
      transmitting a second challenge of the second challenge-response combination;
      waiting for a response, and
         if a correct response of the second challenge-response combination is received, transmitting the requested information; and
         if no response is received, or if an incorrect response of the second challenge-response combination is received, turning off the RFID tag.

9. The method of claim 7, further including instructions for providing an indication that a request to transmit information was received.

10. The method of claim 8, the indication being an audio indication.

11. The method of claim 8, the indication being visual indication.

12. The method of claim 8, further including instructions for withholding the indication when a request is made to transmit information if the request is preceded by a signal from a master controller.

13. An RFID tag, comprising:
   a wireless interface; and
   an information storage including instructions for:
      communicating over the wireless interface to receive a key portion of a key in a personal authentication system, wherein the key portion is a portion of a key divided into a number of portions corresponding to a number of RFID tags in a personal authentication system, and further communicating over the wireless interface to receive at least one challenge-response combination;
      storing the key portion of a key and the at least one challenge-response combination in the information storage;

receiving over the wireless interface a request for information;

in response to the request, retrieving a first challenge-response combination of the at least one challenge-response combination;

transmitting a first challenge of the first challenge-response combination;

waiting for a response; and if a correct response of the first challenge-response combination is received, transmitting the requested information; and if an incorrect response of the first challenge-response combination is received, presenting a second challenge-response combination in response to determining that the received response to the challenge is incorrect wherein the RFID tag is attached to, or included in, a common object associated with a person, and is used for personal authentication.

14. The RFID tag of claim 13, further comprising an indicator.

15. The RFID tag of claim 14, wherein the indicator is an audio indicator.

16. The RFID tag of claim 14, wherein the indicator is a visual indicator.

17. The RFID tag of claim 14, the information storage further including instructions for activating the indicator following receipt of the request for information.

18. The RFID tag of claim 17, the information storage further including instructions for withholding the activation of the indicator if the request for information is preceded by a signal from a master controller.

19. The RFID tag of claim 13, incorporated into one of a key ring, a bead, a stone, a tiepin, a watch, a wallet, and a card.

20. The RFID tag of claim 13, wherein the request for information is a request for a key fragment.

* * * * *